US006979138B2

(12) United States Patent
Kawazura

(10) Patent No.: US 6,979,138 B2
(45) Date of Patent: Dec. 27, 2005

(54) MOUNT LOCK APPARATUS FOR CAMERA

(75) Inventor: Kenji Kawazura, Tokyo (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/752,671

(22) Filed: Jan. 8, 2004

(65) Prior Publication Data
US 2004/0141738 A1 Jul. 22, 2004

(30) Foreign Application Priority Data

Jan. 9, 2003 (JP) .............................. 2003-003420

(51) Int. Cl.[7] .......................... G03B 17/00; G03B 17/02
(52) U.S. Cl. ..................................... 396/531; 396/535
(58) Field of Search ............................... 396/354, 529, 396/531, 532, 535

(56) References Cited

U.S. PATENT DOCUMENTS

| | | | | |
|---|---|---|---|---|
| 4,326,783 A | * | 4/1982 | Kawamura et al. | 396/110 |
| 4,860,043 A | * | 8/1989 | Kurei et al. | 396/532 |
| 5,848,314 A | | 12/1998 | Ito et al. | |
| 5,897,229 A | * | 4/1999 | Kawakami | 396/301 |

FOREIGN PATENT DOCUMENTS

| | | |
|---|---|---|
| JP | 53-50420 | 12/1978 |
| JP | 8-43910 | 2/1996 |
| JP | 8-95145 | 4/1996 |
| JP | 10-90773 | 4/1998 |
| JP | 3062957 | 5/2000 |

* cited by examiner

Primary Examiner—Christopher Mahoney
(74) Attorney, Agent, or Firm—Greenblum & Bernstein, P.L.C.

(57) ABSTRACT

A mount lock apparatus for a camera includes a projecting exterior portion provided substantially at a central portion of a front surface of a camera body; a circular annular mount plate, which is fitted to the projecting exterior portion, and to which a photographing lens unit is detachably attached; a mount lock pin which is biased to protrude from the circular annular mount plate to engage with the photographing lens unit; and a mount unlocking button which is operated to move the mount lock pin in a direction to retract from the connecting surface. The mount unlocking button is provided on a portion of an outer peripheral surface of the projecting exterior portion that is located closer to a lens optical axis thereof than a farthermost portion of the projecting exterior portion from the lens optical axis in a horizontal direction of the camera body.

7 Claims, 5 Drawing Sheets a
MOUNT LOCK APPARATUS FOR CAMERA

BACKGROUND OF THE INVENTION

1. Field of the Invention

The present invention relates to an interchangeable lens camera and, more particularly, to a mount lock apparatus therefor.

2. Description of the Related Art

In a mount lock apparatus in a known interchangeable lens camera in which a photographing lens unit is interchangeably attached to a camera body through a bayonet mount, mount lock pins are provided on, and project from, an annular connecting surface of a front decorative member attached to a front surface of the camera body, so that when the mount lock pins are engaged with the photographing lens unit, no rotation or disengagement of the photographing lens unit takes place, as shown in Japanese Unexamined Patent Publication No. 10-90773. The mount lock apparatus is provided with an unlocking button which is operated to move the mount lock pins away from the connecting surface upon attachment or detachment of the photographing lens unit. The unlocking button is provided on a side surface of the front decorative member and is depressed in the optical axis direction to retract the mount lock pins in association therewith in the optical axis direction.

However, in recent cameras which have been miniaturized, the front decorative member cannot be reduced in size in order to preserve high compatibility with various kinds of photographing lens units. In accordance with miniaturization of the camera, the distance between a grip member which can be held by a user, provided on one side of the camera body and the unlocking button provided on the side surface of the front decorative member is reduced. Due to the reduced distance, a user tends to accidentally touch the unlocking button with his or her finger, thus leading to an unintentional operation of the unlocking button. In particular, in the unlocking button which is depressed in the optical axis direction as described above, as the operating direction of the unlocking button with his or her finger and the direction in which the user holds the camera with his or her fingers are identical, an unintentional operation tends to occur, thus resulting in a positional deviation or an accidental detachment of the photographing lens unit. Moreover, a miniaturization of a camera causes the problem of the unlocking button interfering with the user's fingers which hold the grip portion of the camera, so that the user may feel uncomfortable when holding the camera.

SUMMARY OF THE INVENTION

The present invention eliminates the drawbacks of the prior art discussed above, by providing a mount lock apparatus for a camera in which no unintentional operation of an unlocking button occurs.

According to an aspect of the present invention, a mount lock apparatus for a camera is provided, including a projecting exterior portion which is provided substantially at a central portion of a front surface of a camera body; a circular annular mount plate, which is fitted to the projecting exterior portion, and to which a photographing lens unit is detachably attached, the circular annular mount plate having a connecting surface which contacts with the photographing lens unit; a mount lock pin which is biased to protrude from the connecting surface of the circular annular mount plate to engage with the photographing lens unit at a predetermined position; and a mount unlocking button which is operated to move the mount lock pin in a direction to retract from the connecting surface. The mount unlocking button is provided on a portion of an outer peripheral surface of the projecting exterior portion that is located closer to a lens optical axis thereof than a farthermost portion of the projecting exterior portion from the lens optical axis in a horizontal direction of the camera body.

It is desirable for the operating direction of the mount unlocking button to be parallel to a plane which is perpendicular to an optical axis of the photographing lens unit.

It is desirable for the mount unlocking button to be connected to an auto-focusing lens drive pin via a link mechanism.

It is desirable for the link mechanism to be provided with a mode selection device for selecting an auto-focus mode or a manual focus mode.

It is desirable for the mount unlocking button to be located inside a vertically-extending tangential plane of the outermost edge of the projecting exterior portion.

In another embodiment, a camera having a mount lock apparatus is provided, including a projecting exterior portion which is provided substantially at a central portion of a front surface of a camera body of the camera; a circular annular mount plate which is fitted to the projecting exterior portion and to which a photographing lens unit is detachably attached, the circular annular mount plate having a connecting surface which contacts with the photographing lens unit; a mount lock pin which is biased to protrude from the connecting surface to engage with the photographing lens unit at a predetermined position; and a mount unlocking button which is operated to move the mount lock pin in a direction to retract from the connecting surface. The mount unlocking button is provided on a portion of an outer peripheral surface of the projecting exterior portion that is located closer to a lens optical axis thereof than a farthermost portion of the projecting exterior portion from the lens optical axis in a horizontal direction of the camera body.

The present disclosure relates to subject matter contained in Japanese Patent Application No. 2003-3420 (filed on Jan. 9, 2003) which is expressly incorporated herein in its entirety.

BRIEF DESCRIPTION OF THE DRAWINGS

The invention will be discussed below in detail with reference to the accompanying drawings, in which.

DESCRIPTION OF THE PREFERRED EMBODIMENTS

Figure 1:
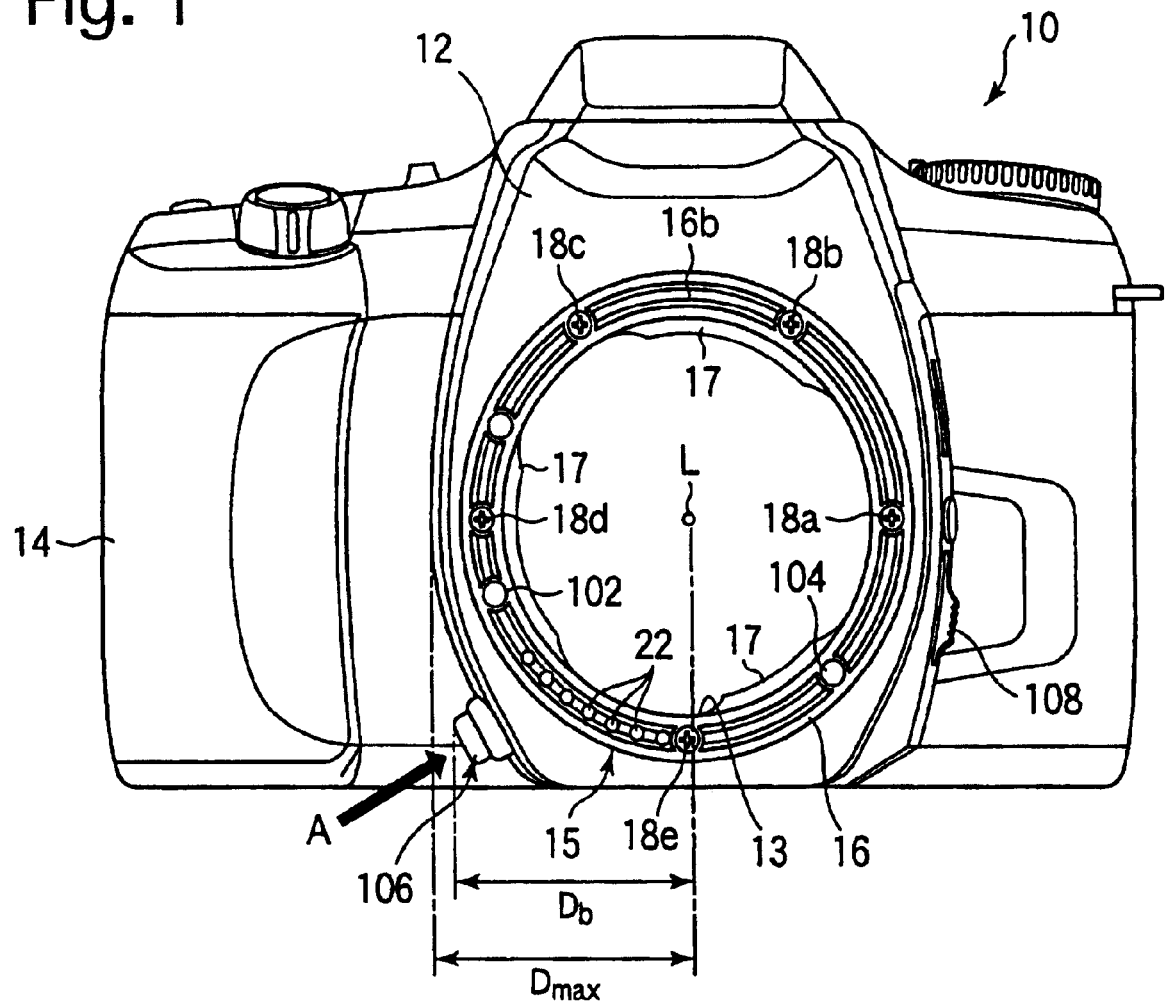
FIG. 1 is a front elevational view of a camera having a mount lock mechanism, with a photographing lens unit removed, according to a first embodiment of the present invention.
Figure 2:
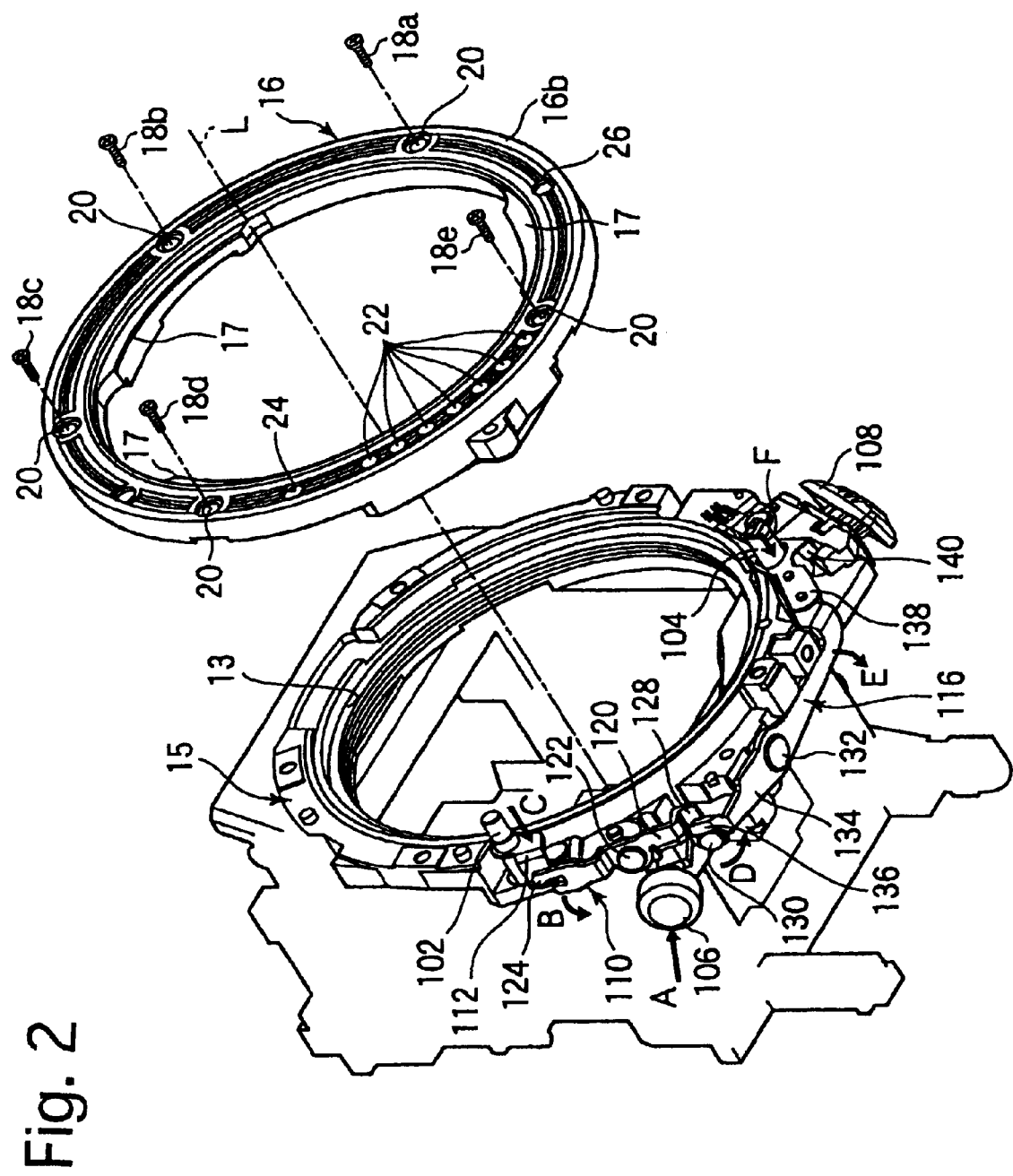
FIG. 2 is an exploded perspective view of a projecting exterior portion and a mount plate in a camera shown in FIG. 1.

In FIG. 1 shows a front elevational view of a camera to which a mount lock apparatus according to an embodiment of the present invention is applied, with a photographing lens unit (lens barrel) removed therefrom. FIG. 2 shows a partial perspective view of a projecting exterior portion 12 of a camera. Note that the components of the projecting exterior portion 12 that are not related to the mount lock apparatus of the present invention are omitted in FIG. 2.

The camera includes a box-shaped camera body 10 which is provided on its front surface with an egg-shaped exterior portion (projecting exterior portion 12) integral therewith which projects outward and is located substantially at the central portion of the front surface. The camera body 10 is also provided with a grip portion 14 shown on the left side of the camera body 10 in FIG. 1. The camera body 10, the projecting exterior portion 12 and the grip portion 14, etc., are formed as an integral synthetic resin mold. The projecting exterior portion 12 is made integral with a mirror box (the contour thereof indicated by a solid line in FIG. 2) accommodated in the camera body 10, and is provided with a circular opening 13 which opens into the front surface of the camera body 10. The peripheral front end surface of the circular opening 13 defines a mount 15 to which the photographing lens unit can be attached. A circular-annular mount plate 16, having a center which is located on a lens optical axis L of the photographing lens unit, is attached and secured to the mount 15 by five screws 18a to 18e. The photographing lens unit (not shown) is detachably attached to the mount plate 16 via a bayonet mount. The mount plate 16 is provided on its inner peripheral surface with engagement members 17, the number of which being the same as that of bayonet pawls (not shown) provided on the photographing lens unit. In the illustrated embodiment, three engagement members 17 are spaced at an equal angular distance in the circumferential direction.

In a front elevation of the mount plate 16, the screw 18a is located on the right side of the mount plate 16 substantially at the same vertical position (as shown in FIG. 1) as the optical axis L which coincides with the center axis of the circular opening 13. The screw 18d is diametrically opposed to the screw 18a, i.e., is located on the left side of the mount plate 16 substantially at the same vertical position (as shown in FIG. 1) as the optical axis L. The screws 18b and 18c are located between the screws 18a and 18d and at a higher vertical position than the screws 18a and 18d (as shown in FIG. 1), in that order in the counterclockwise direction. The screws 18a, 18b, 18c and 18d are spaced at a substantially equal angular distance in the circumferential direction. The screw 18e is located at a lower portion of the mount plate 16 at a substantially intermediate position between the screws 18a and 18d.

The mount 16 is provided with five threaded holes 20 corresponding to the screws 18a through 18e, a plurality of electrical contacts 22 which are adapted to send an electrical power supply and data communication between the camera body and the photographing lens unit, a pin hole 24 in which a mount lock pin 102 for determining the angular position of the photographing lens unit at a predetermined position is inserted, and a pin hole 26 in which a lens drive pin 104 for connecting an auto-focusing lens drive mechanism (not shown) incorporated in the photographing lens unit and a drive shaft (not shown) of a motor incorporated in the camera body 10 is inserted. The electric contacts 22 are located between the screws 18d and 18e and adjacent to the screw 18e. The mount lock pin 102 is located between the electrical contact 22 closest to the screw 18d and the screw 18d. The lens drive pin 104 is located substantially at a median point between the screws 18a and 18e.

The mount lock pin 102 and the lens drive pin 104 are provided on the projecting exterior portion 12 so that the center axes thereof extend in parallel with the lens optical axis L. The mount lock pin 102 and the lens drive pin 104 are relatively movable in the central axis direction, i.e., in a direction parallel with the lens optical axis L. The mount lock pin 102 and the lens drive pin 104 are continuously biased forwards by a spring to project from the annular connecting surface 16b of the mount plate 16. The mount lock pin 102 and the lens drive pin 104 can be retracted from the connecting surface 16b so that the photographing lens unit can be relatively rotated to attach to or detach from the camera body.

In a front elevation of the camera body 10, the projecting exterior portion 12 has an oval shape (egg shape), as can be seen in FIG. 1. Namely, the projecting exterior portion 12 gradually increases in the lateral width from the upper end toward the lens optical axis L which passes through the center of the circular opening 13, so that the lateral width is at a maximum in the vicinity of the lens optical axis L. The lateral width of the projecting exterior portion 12 is gradually reduced from the vicinity of the lens optical axis L toward the lower end. The projecting exterior portion 12 is provided, on its left side portion as shown in FIG. 1, with a unlocking button 106 near the lower end, so that when the unlocking button 106 is depressed toward the lens optical axis L (in the direction "A" in FIG. 1), the mount lock pin 102 and the lens drive pin 104 are retracted from connecting surface 16b.

The unlocking button 106 is located in a position which is slightly deviated toward the lens optical axis L with respect to the outermost edges of the largest width portion of the projecting exterior portion 12 in the horizontal direction (right and left direction in FIG. 1). Namely, the horizontal distance Db from the unlocking button 106 to the lens optical axis L is smaller than the horizontal distance Dmax from the outermost edge of the projecting exterior portion 12 to the lens optical axis L, so that the unlocking button 106 is located closer to the lens optical axis L than the outermost edge of the projecting exterior portion 12 which is located farthest from the lens optical axis L. It is desirable for the unlocking button 106 not to extend outside (i.e., to be entirely inside) the horizontal distance Dmax. Consequently, no interference of the user's fingers which hold the grip portion 14 on the left side of the camera body 10 in FIG. 1 with the unlocking button 106 takes place, so that no unintentional operation of the unlocking button 106 occurs and the user does not feel uncomfortable when holding the camera. Furthermore, as the operating direction of the unlocking button 106 is not parallel with the lens optical axis L but substantially perpendicular to the lens optical axis L, if the camera body 10 is held from the front thereof by the fingers, the pressing direction of the fingers which is substantially in a direction parallel with the lens optical axis L is not the same as the operating direction of the unlocking button, and hence, no unintentional operation of the unlocking button 106 occurs. Moreover, it is possible for a user who holds the camera body 10 with his or her right hand to operate the unlocking button 106 with his or her left hand, while supporting the photographing lens unit from below with the left hand, in order to replace the interchangeable lens. Thus, the interchangeable lens can be easily replaced. Note that the operating direction can be a direction not perpendicular to the lens optical axis L, as long as the operating direction extends in a plane perpendicular to the lens optical axis L.

A mode selection slide knob (mode selection device) 108 is provided on the lower portion of the right side surface of the projecting exterior portion 12 in FIG. 1. When the mode selection slide knob 108 is in a position shown in FIG. 1, the auto-focus mode is selected. When the photographing lens unit is attached to the mount 15, the lens driving mechanism of the photographing lens unit is automatically connected to the motor drive shaft of the camera body 10 through the lens drive pin 104. When the mode selection slide knob 108 is moved upward along the side surface of the projecting exterior portion 12 from the position shown in FIG. 1 to a manual focus mode, only the lens drive pin 104 is retracted from the connecting surface 16b so that no connection between the lens drive mechanism and the motor drive shaft is established even if the photographing lens unit is attached to the projecting exterior portion 12.

Figure 3:
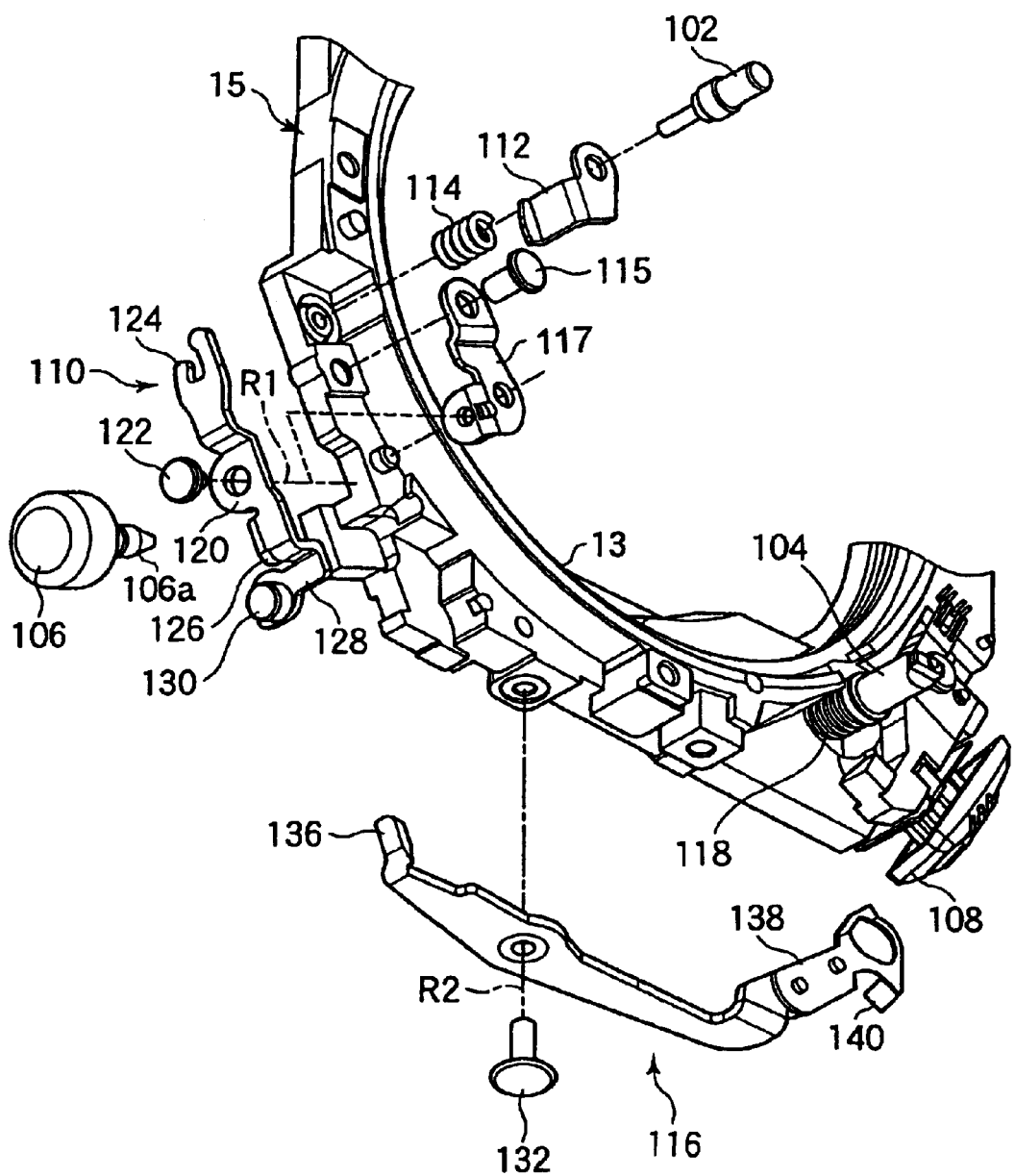
FIG. 3 is an exploded perspective view of a mount lock mechanism.
Figure 4:
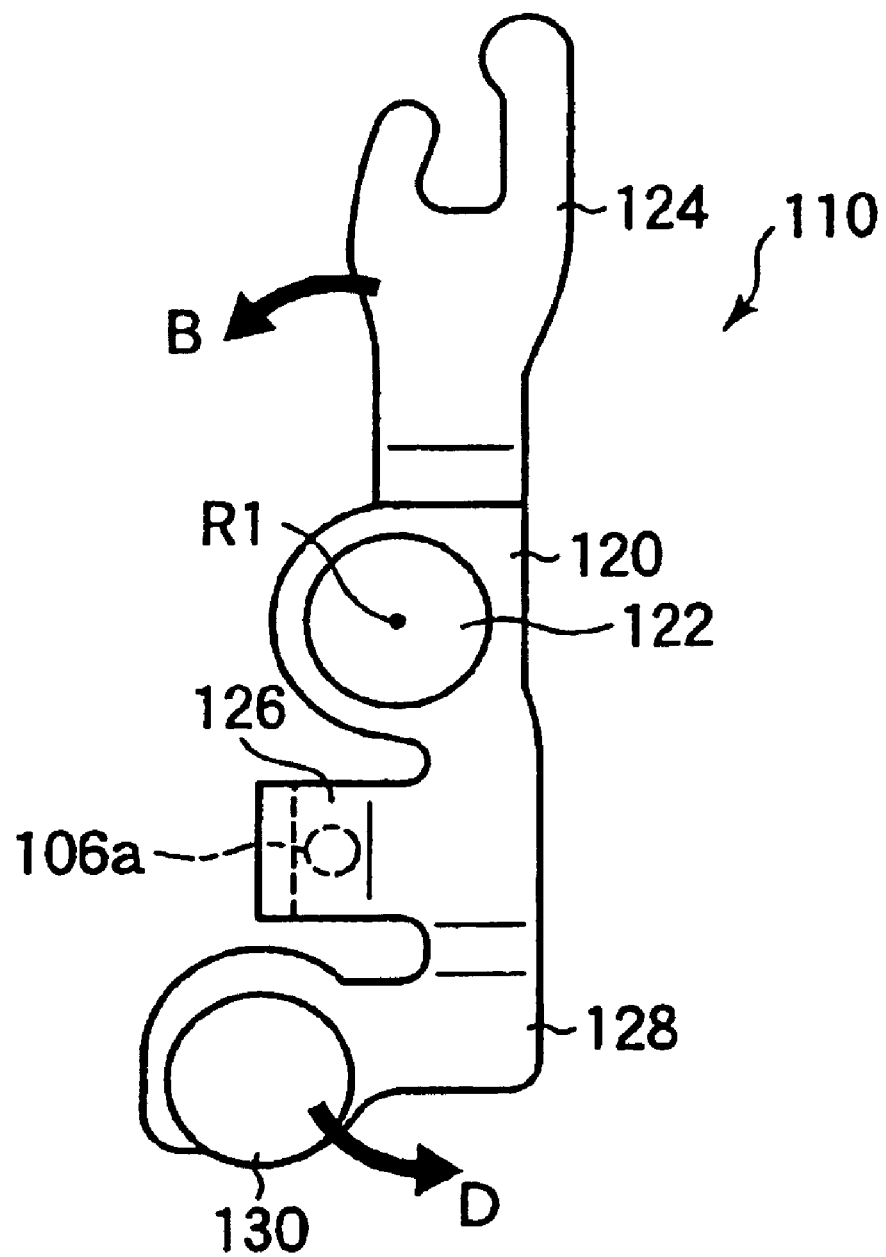
FIG. 4 is a plan view of a lever member of a mount lock mechanism.

The mount lock mechanism of the present invention will be discussed with reference to FIGS. 2 through 5. FIG. 3 is a perspective view of the mount lock mechanism. FIG. 4 is a plan view of a first rotation lever 110 which constitutes the mount lock mechanism and FIG. 5 is a side view thereof.

The mount lock mechanism is constructed from the mount lock pin 102 and the unlocking button 106, a first rotation lever 110 and an engagement member 112, for connecting the mount lock pin and the unlocking button, and a spring 114 which biases the mount lock pin 102 forwards in the axial direction. Furthermore, the mount lock mechanism is constructed from a second rotation lever 116 which connects the first rotation lever 110 and the lens drive pin 104, and a spring 118 which biases the lens drive pin 104 in the axial direction. The mode selection slide knob 108 engages with one end of the second rotation lever 116. The first and second rotation levers constitute a link mechanism for connecting the unlocking button 106 with the lens drive pin 104.

Figure 5:
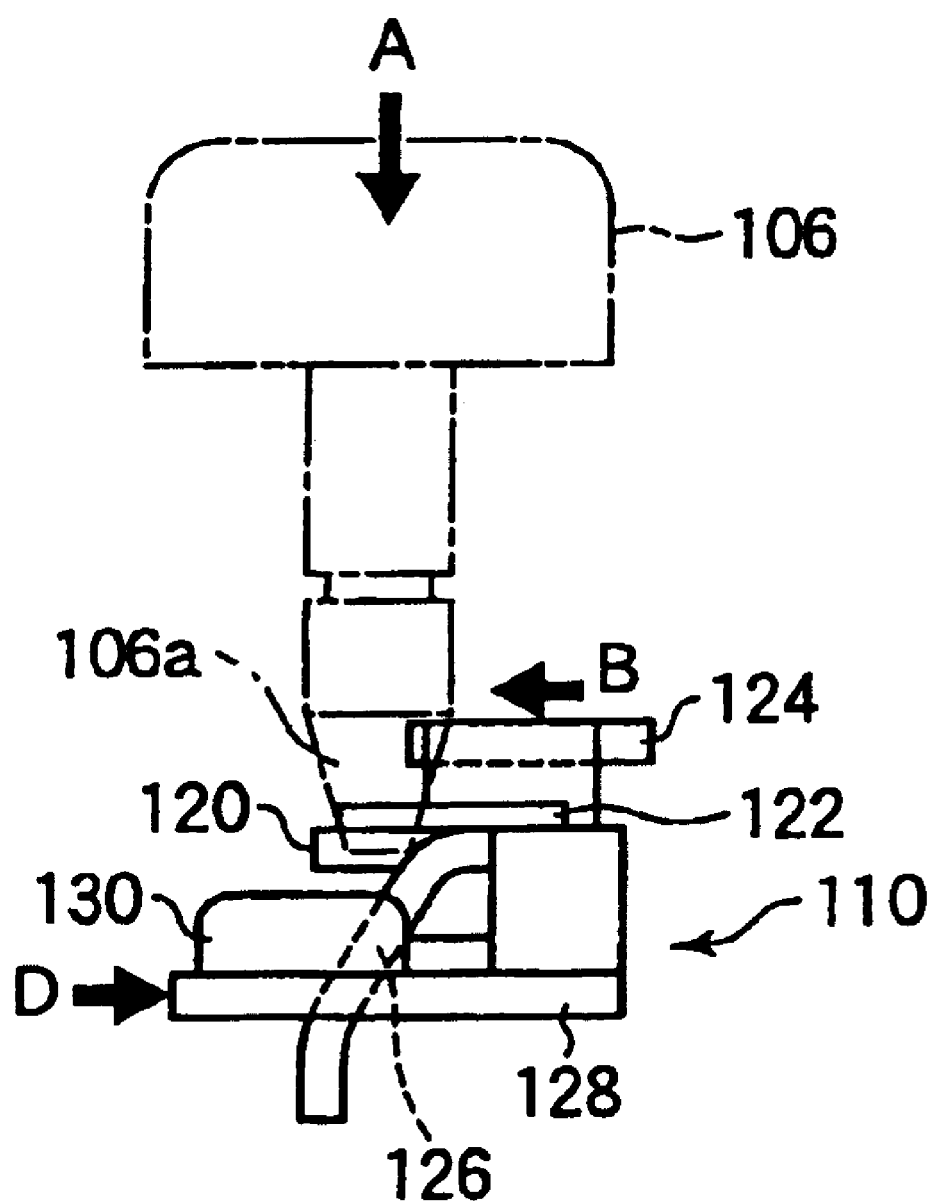
FIG. 5 is a side view of a lever member of a mount lock mechanism.

As shown in FIGS. 4 and 5, the first rotation lever 110 is made of an elongated plate which is bent stepwise along the circular annular side surface of the projecting exterior portion 12. An intermediate plate portion 120 of the first rotation lever 110 is rotatably connected to a support plate 117 (which is secured to the side surface of the mount 15 by a screw 115) via a shaft member 122. The axis of the shaft member 122, i.e., the rotation axis R1 of the first rotation lever 110 extends substantially perpendicular to the lens optical axis L. A bifurcated plate portion 124 extending from the intermediate plate portion 120 toward the mount lock pin 102 engages with the front end of the engagement member 112 which is fitted to the mount lock pin 102, so that the front end of the engagement member 112 is held between the bifurcated arms of the bifurcated plate portion 124. The bifurcated plate portion 124 extends substantially parallel with the intermediate plate portion 120 and is stepped with respect thereto. The intermediate plate portion 120 extends in the direction opposite to the bifurcated portion 124 to form a bent plate portion 126 extending downwardly (FIG. 5) from the left side of the extension of the intermediate plate portion 120 in FIG. 4. The bent plate portion 126 extends downwardly with respect to the intermediate plate portion 120 toward the lens optical axis L, so that the unlocking button 106 abuts at the front end thereof against the bent plate portion 126. Note that the front end of the unlocking button 106 is indicated by a phantom line in FIG. 4 and the unlocking button 106 is indicated by phantom lines in FIG. 5.

The unlocking button 106 has an axis parallel with the rotation axis R1, so that when the unlocking button 106 is depressed in the axial direction thereof toward the lens optical axis L (as indicated by an arrow A in FIG. 5), the front end 106a of the unlocking button 106 presses while sliding on the bent plate portion 126 (oblique surface). Consequently, the first rotation lever 110 is rotated about the rotation axis R1 in the counterclockwise direction in FIG. 4. Thus, the bifurcated plate portion 124 is rotated in the counterclockwise direction B, and accordingly, the engagement member 112 which engages wit the bifurcated plate portion 124 is moved in the direction C parallel with the lens optical axis L, toward the inward of the projecting exterior portion 12. As a result, the mount lock pin 102 is moved in the direction C against the spring force of the spring 114 and is retracted from the connecting surface 16b.

The linkage between the unlocking button 106 and the lens drive pin 104 will be discussed below.

As shown in FIGS. 3 through 5, the first rotation lever 110 is provided with an association plate portion 128 which extends from the intermediate plate portion 124 in the direction opposite to the bifurcated plate portion 124 and which is in parallel with the intermediate plate portion 120 and is stepped with respect thereto. The association plate portion 128 is provided with a projection 130 in the form of a cylindrical stud, integral therewith, which is engaged at its side surface with the second rotation lever 116.

In FIGS. 2 and 3, the second rotation lever 116 is rotatably connected to the flat bottom surface portion of the projecting exterior portion 12 through a shaft member 132. The axis of the shaft member 132, i.e., the rotation axis R2 of the second rotation lever 116, is substantially perpendicular to the lens optical axis L. The second rotation lever 116 is constructed from an elongated flat mounting plate portion 134, an engaging plate portion 136 which is bent toward the lens optical axis L at the left end of the mounting plate portion 134 in FIG. 3, and a fitting plate portion 138 which extends perpendicularly to the lens optical axis L and is mounted to the right end of the mounting plate portion 134 in FIG. 3. The engaging plate portion 136 abuts against the side surface of the circular cylindrical projection 130 from the forward direction of the camera, i.e., from the right upward direction to the left downward direction in FIG. 2. The lens drive pin 104 is biased by the spring 118 in the direction projecting from the connecting surface 16b of the mount plate 16 and is engaged by the fitting end 138 of the second rotation lever 116 at the end of the lens drive pin 104 opposite to the spring 118.

When the unlocking button 106 is depressed in the direction "A", the first rotation lever 110 is rotated in the counterclockwise direction, so that the engaging plate portion 136 is biased in the forward direction of the camera by the cylindrical projection 130 of the first rotation lever 110. The second rotation lever 116 is rotated in the clockwise direction (direction E in FIG. 2) about the rotation axis R2, so that the fitting plate portion 138 at the end of the second rotation lever 116 opposite to the engaging plate portion 136 is moved in the direction parallel with the lens optical axis L and toward the inward of the projecting exterior portion 12 (in the direction F in FIG. 2). The lens drive pin 104 is moved against the spring 118 in the direction F and is retracted from the connecting surface 16b.

As can be understood from the above discussion, when the unlocking button 106 is depressed in the direction "A", the mount lock pin 102 and the lens drive pin 104 are moved together, and are retracted from the connecting surface 16b in accordance with the cooperation of the first rotation lever 110, the engagement member 112 and the second rotation lever 116. Consequently, the locking state is released, so that the photographing lens unit can be attached to or detached from the camera body 10. When the unlocking button 106 which has been depressed is released, the mount lock pin 102 and the lens drive pin 104 are automatically returned to the initial position in which the pins protrude from the connecting surface 16b, by the spring force of the respective springs 114 and 118. Therefore, if the photographing lens unit is mounted, it can be retained in a predetermined position.

When the photographing lens unit is mounted to the projecting exterior portion 12, the mount lock pin 102 is pressed by the connecting surface on the photographing lens unit side, so that the mount lock pin 102 is moved in the direction C parallel with the lens optical axis L against the spring force of the spring 114. Thus, the mount lock pin 102 is retracted from the connecting surface 16b. Consequently, the engagement member 112 integral with the mount lock pin 102 is moved in the direction C, so that the bifurcated plate portion 124 of the first rotation lever 110 which holds engagement member 112 between the bifurcated arms is moved in the direction C. Consequently, the first rotation lever 110 is rotated in the counterclockwise direction (direction B as shown in FIG. 2) about the rotation axis R1.

The second rotation lever 116 is provided with a bent plate portion 140 integral therewith, which obliquely extends downward from the lower end of the fitting plate portion 138 of the second rotation lever 116 toward the lens optical axis L. As can be seen in FIG. 2, the bent plate portion 140 is engaged by a part of the mode selection slide knob 108 from below the projecting exterior portion 12. When the mode selection slide knob 108 is located in the auto-focus mode position, i.e., at the lower mode position shown in FIG. 1, and the unlocking button 106 is not operated, the lens drive pin 104 protrudes from the connecting surface 16b, so that the lens drive mechanism of the photographing lens unit and the motor drive shaft of the camera body 10 can be connected. When the mode selection slide knob 108 is slid to the manual focus mode position, i.e., the upper mode position, the mode selection slide knob 108 presses and slides on the oblique surface of the bent plate portion 140. Consequently, the second rotation lever 116 is rotated in the direction E in FIG. 2, so that the lens drive pin 104 is retracted from the connecting surface 16b. Accordingly, in the manual focus mode, the lens drive mechanism cannot be connected to the motor drive shaft, whether the unlocking button 106 is operated or not.

In a lock mechanism of the prior art, in which the mount lock pin 102 is connected to the mount lock releasing button (unlocking button) 106 through a plate member perpendicular to the lens optical axis L, when the mount unlocking pin 106 is depressed in the lens optical axis direction L, the plate member is pressed at one end thereof, so that the mount lock pin 102 connected to the other end of the plate member is retracted in the lens optical axis direction L. In such a conventional structure, it is necessary to depress the mount unlocking pin 106 with a force identical to that necessary to retract the mount lock pin 102. Therefore, in order to securely retract the mount lock pin 102 from the connecting surface, it is difficult to increase the distance between the plate member, i.e., the mount unlocking button 106 and the mount lock pin 102. Namely, if the distance between the mount unlock button 106 and the mount lock pin 102 is large, it is difficult for the force exerted on the mount unlocking button 106 to be transferred to the mount lock pin 102 due to bending of the plate member bending. As long as the mount lock pin 102 is located at a predetermined position, there is no freedom to determine the position of the mount unlocking button 106.

However, in the mount lock mechanism of the present invention, the first rotation lever 110 which rotates about the rotation axis R1 perpendicular to the lens optical axis L is used as a member for connecting the mount lock pin 102 and the mount unlocking button 106. The length of the first rotation lever 110 can be optionally determined, because the balance between the force necessary to retract the mount lock pin 102 and the pressing force of the mount unlocking button 106 can be varied only by the ratio between the distance between the mount lock pin 102 (engaging member 112) and the rotation axis R1 and the distance between the mount unlocking button 106 and the rotation axis R1. Therefore, the length of the first rotation lever 110 can be optionally set. Consequently, the freedom to determine the relative position of the mount unlocking button relative to the mount lock pin 102 can be considerably enhanced. Accordingly, it is possible to locate the mount unlocking button 106 at the lower portion of the projecting exterior portion 12 so as not to interfere with the user's hand holding the camera, even if the mount lock pin 102 is located in the vicinity of the center of the mount plate 16 in the vertical direction.

As can be understood from the foregoing, in a mount lock mechanism for a camera according to the present invention, no unintentional operation of the mount unlocking button occurs.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A mount lock apparatus for a camera comprising:
   a projecting exterior portion which is provided substantially at a central portion of a front surface of a camera body;
   a circular annular mount plate, which is fitted to said projecting exterior portion, and to which a photographing lens unit is detachably attached, said circular annular mount plate having a connecting surface which contacts with said photographing lens unit;
   a mount lock pin which is biased to protrude from said connecting surface of the circular annular mount plate to engage with said photographing lens unit at a predetermined position; and
   a mount unlocking button which is operated to move said mount lock pin in a direction to retract from said connecting surface;
   wherein said mount unlocking button is provided on a portion of an outer peripheral surface of said projecting exterior portion that is located closer to a lens optical axis thereof than a farthermost portion of said projecting exterior portion from the lens optical axis in a horizontal direction of said camera body, and
   wherein a horizontal distance from the lens optical axis to a head portion of the mount unlocking button is smaller than a horizontal distance from the lens optical axis to an outermost edge of the projecting exterior portion.

2. The mount lock apparatus for a camera according to clam 1, wherein the operating direction of said mount unlocking button is parallel to a plane which is perpendicular to an optical axis of the photographing lens unit.

3. The mount lock apparatus for a camera according to claim 1, wherein said mount unlocking button is connected to an auto-focusing lens drive pin via a link mechanism.

4. The mount lock apparatus for a camera according to claim 3, wherein said link mechanism is provided with a mode selection device for selecting an auto-focus mode or a manual focus mode.

5. The mount lock apparatus for a camera according to claim 1, wherein said mount unlocking button is located inside a vertically-extending tangential plane of the outermost edge of the projecting exterior portion.

6. A camera having a mount lock apparatus, comprising:
a projecting exterior portion which is provided substantially at a central portion of a front surface of a camera body of said camera;
a circular annular mount plate, which is fitted to said projecting exterior portion, and to which a photographing lens unit is detachably attached, said circular annular mount plate having a connecting surface which contacts with said photographing lens unit;
a mount lock pin which is biased to protrude from said connecting surface of said circular annular mount plate to engage with said photographing lens unit at a predetermined position; and
a mount unlocking button which is operated to move the mount lock pin in a direction to retract from said connecting surface,
wherein said mount unlocking button is provided on a portion of an outer peripheral surface of said projecting exterior portion that is located closer to a lens optical axis thereof than a farthermost portion of said projecting exterior portion from the lens optical axis in a horizontal direction of said camera body, and
wherein a horizontal distance from the lens optical axis to a head portion of the mount unlocking button is smaller than a horizontal distance from the lens optical axis to an outermost edge of the projecting exterior portion.

7. A mount lock apparatus for a camera comprising:
a projecting exterior portion which is provided substantially at a central portion of a front surface of a camera body;
a circular annular mount plate, which is fitted to said projecting exterior portion, and to which a photographing lens unit is detachably attached, said circular annular mount plate having a connecting surface which contacts with said photographing lens unit;
a mount lock pin which is biased to protrude from said connecting surface of the circular annular mount plate to engage with said photographing lens unit at a predetermined position; and
a mount unlocking button which is operated to move said mount lock pin in a direction to retract from said connecting surface;
wherein said mount unlocking button is provided on a portion of an outer peripheral surface of said projecting exterior portion that is located closer to a lens optical axis thereof than a farthermost portion of said projecting exterior portion from the lens optical axis in a horizontal direction of said camera body, and
wherein the operating direction of said mount unlocking button is parallel to a plane which is perpendicular to an optical axis of the photographing lens unit.

* * * * *